United States Patent Office 2,693,462
Patented Nov. 2, 1954

2,693,462

START-UP POLYMERIZATION OF ACRYLONITRILE

Algernon P. Guess and William B. McCaskill, Camden, S. C., assignors to E. I. du Pont de Nemours & Company, Wilmington, Del., a corporation of Delaware No Drawing. Application June 27, 1951,
Serial No. 233,953

7 Claims. (Cl. 260—88.7)

This invention relates to a continuous polymerization process and especially to a process for producing acrylonitrile polymers or copolymers of improved uniformity from the very beginning of continuous "constant environment" polymerizing.

As described in the copending application Serial No. 75,436 of J. C. Richards, now Patent No. 2,628,223 a method is known for producing acrylonitrile polymers of uniform average molecular weight which involves maintaining the pH of the polymerizing medium constant whereby a continuous flow of polymer from the reactor is obtained having substantially constant average molecular weight. This continuous polymerization process may be classed as continuous, homogeneous, constant environment polymerization and differs in fundamental respects from other "continuous" processes known in the art. The constant environment polymerization process depends on the use of a reactor having a relatively large volume in relation to the rate of feed (in general, a displacement rate of 50–100 minutes has been found satisfactory). The medium containing the polymer overflows continuously, and the product is isolated from a medium identical to that in which the reaction is progressing. Since small variations in flows result in concentration and activity changes and in significant loss of product quality and uniformity, the selection of the environment is critical.

Every effort is made to maintain this environment at the optimum throughout the course of the operation. In such a system, however, the rate of reaction and the product quality approach a substantially steady state only after the rates of feeds are held constant for a period of time determined by the ratio of the reactor volume to the rate of feeds. In general, a steady state has been substantially reached after a steady flow of reactants has been maintained long enough to have resulted in a total flow equivalent to two to three times the reactor volume. Since the reactor necessarily is large, the early periods of operation result in the production of sizeable quantities of product differing significantly from that produced under steady state conditions. This difference is exhibited usually in the form of a deviation in: average molecular weight, the molecular weight distribution around this average and the physical form of the product. In general, the monomer approaches the steady state concentration more rapidly than do the catalyst and activator. This results in an abnormally high molecular weight due to the low catalyst activity in the early stages. Difficulty in isolation of the product also follows from the production of fine polymer particles in the early stages which blind the filter medium.

Obviously, it is costly to produce a sizeable quantity of off-standard polymer and it is a primary object of this invention to provide a start-up procedure for the continuous, constant environment polymerization that produces from the beginning polymer of the desired molecular weight. It is, of course, possible to sacrifice some uniformity in the initial molecular weight and physical form of the product in favor of simplicity of the start-up procedure without departing from the spirit of this invention, and a secondary object of this invention is to provide an improved procedure for starting a continuous, constant environment polymerization process with sufficiently close approximation of initial average molecular weight of the polymer as to be useable even though blending may be necessary. Other objects will be apparent from the description that follows.

The objects of this invention are accomplished by partially filling the reactor vessel initially with water at the desired pH and then by altering the feed rates of one or more of the elements of the reaction composition, such as the water, the polymerizable monomers (such as acrylonitrile), the catalyst (water-soluble perdisulfate), the activator (water-soluble sulfoxy-type reducing agent), while maintaining the pH of the reaction medium substantially constant in the range of from about 2.75 to about 3.75. The temperature used during the polymerization may be from room temperature to about 100° C. with temperatures of about 20° C. to about 75° C. being preferred. While the process is described with reference to acrylonitrile, the process is effective in the preparation of copolymers of acrylonitrile with vinyl pyridines, vinyl acetate, vinyl chloride, styrene, and the like.

In general, the reactor is about half filled with water and adjusted to the proper pH and heated to the desired polymerizing temperature before introducing the polymerizing reagents. Also, the flows of acrylonitrile monomer and water are generally begun at normal or steady state rates. Since a measurable period of time elapses before any monomer reacts and since the initial concentration of monomer based on total feeds is four times the steady state concentration in the reactor (assuming conversion of monomer to polymer at steady state amounts to about 75%), the concentration of monomer builds up rapidly to approach the steady state. Further, the catalyst and activator begin reacting to form polymerization initiators and they also react with each other to form salts that are useless as catalysts. This results in a slow attainment of steady state environment for the polymerization. To avoid the adverse effects of an advanced monomer concentration the flows of catalyst and activator are adjusted to from 10% to 40% higher than the normal ratio of catalyst-activator feed to polymerizable monomer feed for a period of one-half to three hours after the start of the reaction. Flow increases of 30% for the first one-half hour and 18% for the subsequent hour have been very satisfactory. By increasing the flow ratio of catalyst and activator to polymerizable monomer in the early stages, a substantially constant environment is obtained more rapidly and acceptable quality product may be produced from the first reactor effluent.

To further illustrate this invention without any intention of limiting the scope of this invention the following specific examples are given.

*Example 1*

To a suitable reaction vessel having a weight capacity of 1,458 parts to the overflow nozzle was charged 729 parts (by weight) of demineralized water. This was then adjusted to a pH of 3.25 with 50% sulfuric acid. After heating to 43° C. and while stirring the charge, the flows of reagents were begun as follows:

| Reagents | Parts By Weight Per Hour |
|---|---|
| Demineralized Water | 774 |
| Acrylonitrile | 127 |
| Potassium perdisulfate-catalyst-(4 percent aqueous solution) | 25.5 |
| Sodium metabisulfite-activator-(20 percent aqueous solution) | 8.7 |
| Sulfuric acid-(1.2 percent aqueous solution) | (¹) |

¹ Sufficient to control pH at 3.25.

These flows were maintained for the first one-half hour after which the flow of potassium perdisulfate solution was changed to 24 parts by weight per hour and the flow of sodium metabisulfite solution to 8.2 parts by weight per hour for the next hour. After 1½ hours the flow of potassium perdisulfate solution was reduced to 19.5 parts by weight per hour and the flow of sodium metabisulfite solution was reduced to 6.7 parts per hour and these flows remained constant thereafter. The flows of other reagents recorded above remained constant throughout the test. The reactor overflowed approximately 41 minutes after flows were started and the polymer contained in this slurry showed an intrinsic viscosity of 1.83 which corresponds to an average molecular weight of about 60,000. Twenty minutes later the intrinsic viscosity was 1.85 and during the subsequent 24 hours all samples had an intrinsic viscosity in the range of 1.81 to 1.89 (molecular weights between 59,200 and 61,700) and no slurry filtration difficulty was encountered.

On a percentage basis the catalyst and activator flows were increased 31% during the first one-half hour and 23% during the subsequent hour over the normal flow rates for steady state operation. It is, indeed, surprising that this change in flow rates is so effective in maintaining such constant results in polymer size and physical form as reflected by lack of filtration difficulty.

In contrast with the results of Example I, the following illustrative procedure is set forth to show how the molecular weight of the polymer varies and how difficulty is encountered if the process of this invention is not followed. Here the reaction vessel of Example I was charged with 1,350 parts by weight of demineralized water, which was then adjusted to a pH of 3.25 with 50% sulfuric acid. After heating the medium to 43° C. and starting the agitator, the following flows of reagents were begun:

| Reagents | Parts By Weight Per Hour |
| --- | --- |
| Demineralized water | 774 |
| Acrylonitrile | 127 |
| Potassium perdisulfate-catalyst-(4 percent aqueous solution) | 19.5 |
| Sodium metabisulfite-activator-(20 percent aqueous solution) | 6.7 |
| Sulfuric acid-(1.2 percent aqueous solution) | (1) |

1 Sufficient to control pH at 3.25.

These flows at steady state operation in the process of this invention produce a polymer having an intrinsic viscosity in the range of from 1.81 to 1.89. However, in the instant case the reactor overflowed within 12 minutes and at that time the effluent contained a faint cloud of polymer. Thirty minutes after the first overflow was observed, the polymer in the slurry had increased to about 6% and had an intrinsic viscosity of 2.25 (about 74,000 molecular weight). It was several hours before the steady state condition was reached and an intrinsic viscosity of 1.81 to 1.89 was obtained. During this time the product was filtered continuously on a rotary drum filter but it was necessary to clean the filter cloth twice due to blinding by the polymer from the early overflow.

*Example II*

The agitator reaction vessel used in Example I was charged exactly as outlined under that example. After the temperature of the charge had been adjusted to 43° C., the flows were started to the reactor as follows:

| Reagents | Parts By Weight Per Hour |
| --- | --- |
| Demineralized Water | 0 |
| Acrylonitrile | 127 |
| Potassium perdisulfate-catalyst-(4 percent aqueous solution) | 24.0 |
| Sodium metabisulfite-activator-(20 percent aqueous solution) | 8.2 |
| Sulfuric acid-(1.2 percent aqueous solution) | (1) |

1 Sufficient to control pH at 3.25.

At the end of the first one-half hour, demineralized water flow was begun at 774 parts by weight per hour, the acrylonitrile feed was maintained at 127 parts by weight per hour, the potassium perdisulfate solution was changed to 23 parts by weight per hour and the sodium metabisulfite was changed to 7.9 parts by weight per hour and these rates maintained for one hour. After the first 1½ hours all flows corresponded to those given below:

| Reagents | Parts By Weight Per Hour |
| --- | --- |
| Demineralized water | 774 |
| Acrylonitrile | 127 |
| Potassium perdisulfate-catalyst-(4 percent aqueous solution) | 19.5 |
| Sodium metabisulfite-activator-(20 percent aqueous solution) | 6.7 |
| Sulfuric acid-(1.2 percent aqueous solution) | (1) |

1 Sufficient to control pH at 3.25.

By following this procedure the first overflow occurred 71 minutes after the flows were started. This first overflow contained a polymer having an intrinsic viscosity of 1.82 and during the subsequent 24 hours all samples showed an intrinsic viscosity in the range of 1.81 to 1.89 and no slurry filtration difficulty was encountered.

In this example while the water flow is withheld, the catalyst and activator flows were 23% above the normal or steady state flow condition and in the next hour the catalyst and activator solutions were fed at the rate of about 18% above the normal or steady state flow conditions.

*Example III*

The reaction vessel used in Example I was charged with 729 parts of demineralized water adjusted to a pH of 3.25 with sulfuric acid as described in Example I. After heating the stirred charge to 43° C., the flows of reagents were begun as follows:

| Reagents | Parts By Weight Per Hour |
| --- | --- |
| Demineralized water | 774 |
| Acrylonitrile | 127 |
| Potassium perdisulfate-catalyst-(4 percent aqueous solution) | 19.5 |
| Sodium metabisulfite-activator-(20 percent aqueous solution) | 6.7 |
| Sulfuric acid-(1.2 percent aqueous solution) | (1) |

1 Sufficient to control pH at 3.25.

Reaction was obtained within 10 minutes as evidenced by a milky dispersion of polymer. The reactor began to overflow approximately 42 minutes after all flows were begun, and a sample of polymer isolated from the initial overflow showed an intrinsic viscosity of 2.10 (about 68,000 molecular weight). Two hours later the overflowing slurry contained a polymer having an intrinsic viscosity of 2.05. At this time the flows of catalyst and activator were increased by 10% and 2 hours later an intrinsic viscosity of 1.89 was observed. The catalyst and activator were then returned to normal or initial flow rates and 2 hours later an intrinsic viscosity of 1.81 was observed. During the subsequent 24 hours all samples showed an intrinsic viscosity in the range of 1.81 to 1.89 and no slurry filtration difficulty was encountered.

It is seen from the foregoing examples that optimum results are obtained by increasing the flow of catalyst and activator to the extent of about 20–30% for the first ½ to 1½ hours initial start-up period after which the additions are brought back to the amount normally used after polymerization has reached a substantially steady state. There may, of course, be considerable variations in these changes and the initial increase in flow of catalyst and activator solutions into the reactor may be maintained for 1 hour, if desired, or for any length of time from ½ to 1½ hours. Furthermore, this cutback to the normal flow rate may be made in three or more steps and under certain circumstances this increased rate of flow may extend over a period of 2 or 3 hours or more. This will, of course, depend on the size of the reactor and the displacement rate thereof.

While optimum results are secured by increasing the flow of the catalyst and activators solutions to an initial feed rate above 20%, definite improvement over batch method start-up is obtainable, as shown in Example III, with an increase of these feeds in an amount of only 10%. In general, if the process of this invention is not employed in continuous polymerizations of acrylonitrile, the time from the start of reagents flows to the time when steady state is reached is definitely lengthened and the polymer produced is noticeably higher in molecular weight than when the system is unbalanced temporarily in favor of higher rates of feed for both the catalyst and activator. However, the molecular weight of the polymer produced as by Example III is of insufficient deviation from the desired molecular weight that it can be used by blending with standard polymer without encountering any difficulty in spinning the solution and without substantial change in the physical properties of the yarn so produced. However, if the molecular weight of the polymer discharged in the initial stages varies substantially, for example, as much as 20% above or below the average viscosity normally obtained from steady state operation, it would be necessary to segregate such off-polymer and to use it for inferior products or perhaps even to discard it.

Instead of increasing the flow of catalyst and activator, similar results may be obtained by decreasing the feed rate of the polymerizable monomer (acrylonitrile) with or without a decrease in the feed rate of the reaction medium (water) while maintaining the rate of feed of catalyst and activator at the normal or steady state rate. Obviously, combinations of decreased rates of feed for some reagents and increased rates of feed for others may be used so long as the ratio of catalyst-activator feed to the polymerizable monomer feed is increased during the early stage by 10% to 40%.

This invention for improving the control of the start-up of a continuous, homogeneous, constant environment polymerization process for acrylonitrile polymer minimizes the production of off-standard products during the period normally required for attainment of constant environment conditions. With control under the preferred conditions as exemplified by Examples I and II, it is not necessary to handle the product of start-up periods in any special manner and it may be classified as standard production and used without blending to produce solutions and yarns therefrom which can be satisfactorily processed to yield yarns of normal physical properties. The process is applicable to the polymerization of acrylonitrile in the presence or absence of copolymerizable monomers. The process of this invention provides a convenient and economic way of producing continuously acrylonitrile polymers of uniform properties.

Any departure from the above description which conforms to the present invention is intended to be included within the scope of the claims.

We claim:
1. In the continuous, homogeneous, constant environment polymerization of acryonitrile monomer comprising polymerization to a polymer having a uniform molecular weight in an aqueous medium of substantially constant pH having a value between about 2.75 and about 3.75, said medium containing polymerization ingredients including a perdisulfate catalyst and an activator comprising a water-soluble sulfoxy reducing agent, the process comprising partially filling a vessel with water; feeding said ingredients to said vessel in a manner whereby the ratio of the catalyst feed to the monomer feed and the ratio of the activator feed to the monomer feed are increased in the early stage of said polymerization by 10% to 40% of the ratios applied in said constant environment polymerization; and gradually reducing said ratios to about their respective values in said constant environment polymerization.

2. In the continuous, homogeneous, constant environment polymerization of acryonitrile monomer comprising polymerization to a polymer having a uniform molecular weight in an aqueous medium of substantially constant pH having a value between about 2.75 and about 3.75, said medium containing polymerization ingredients including a perdisulfate catalyst and an activator comprising a water-soluble sulfoxy reducing agent, the process comprising partially filling a vessel with water; feeding each ingredient to said vessel; initiating polymerization; adjusting the feeding rate of said catalyst and of said activator so that the ratio of catalyst feed to monomer feed and the ratio of activator feed to monomer feed are increased by 10% to 40% in the early stage of said polymerization; gradually reducing said ratios to about their respective values in said constant environment polymerization; and thereafter maintaining the rate of feed of each ingredient substantially constant.

3. A process in accordance with claim 2 wherein said vessel is permitted to overflow, said overflow carrying with it resultant polymer.

4. A process in accordance with claim 2 wherein the ratio of catalyst to monomer feed and the ratio of activator to monomer feed are increased by about 20% to 30% of their respective feed ratios at said steady state.

5. A process in accordance with claim 2 wherein the polymer produced is polyacrlyonitrile.

6. A process in accordance with claim 2 wherein the polymer produced is polyacrylonitrile of intrinsic viscosity between about 1.81 to about 1.89.

7. A process in accordance with claim 2 wherein the temperature of the medium in said vessel is maintained at about 20° C. to about 75° C.

References Cited in the file of this patent

UNITED STATES PATENTS

| Number | Name | Date |
|---|---|---|
| 2,475,016 | De Nie | July 5, 1949 |